United States Patent [19]
Satsuma et al.

[11] Patent Number: 5,355,072
[45] Date of Patent: Oct. 11, 1994

[54] BATTERY DISCHARGING APPARATUS

[75] Inventors: Eiji Satsuma; Tetsuya Okada; Takahiro Yamashita, all of Sumoto, Japan

[73] Assignee: Sanyo Electric Co., Ltd., Moriguchi, Japan

[21] Appl. No.: 916,746

[22] Filed: Jul. 22, 1992

[30] Foreign Application Priority Data

| Jul. 31, 1991 | [JP] | Japan | 3-060416[U] |
| Nov. 15, 1991 | [JP] | Japan | 3-300530 |
| Jan. 23, 1992 | [JP] | Japan | 4-010146 |
| May 27, 1992 | [JP] | Japan | 4-134951 |

[51] Int. Cl.$^5$ ............................................. H02J 7/10
[52] U.S. Cl. .................................. 320/13; 320/14; 320/48
[58] Field of Search ........................... 320/14, 13, 48

[56] References Cited

U.S. PATENT DOCUMENTS

| 3,796,940 | 3/1974 | Mauch et al. | 320/14 |
| 4,281,278 | 7/1981 | Bilsky et al. | 320/13 |
| 4,302,714 | 11/1981 | Yefsky | 320/14 X |
| 4,742,289 | 5/1988 | Wahlström | 320/14 |
| 4,755,733 | 7/1988 | Laliberté | 320/14 X |
| 5,168,206 | 12/1992 | Jones | 320/14 X |
| 5,182,509 | 1/1993 | Simmonds | 320/14 |

FOREIGN PATENT DOCUMENTS 62-193516  8/1987  Japan .

*Primary Examiner*—R. J. Hickey
*Attorney, Agent, or Firm*—Wenderoth, Lind & Ponack

[57] ABSTRACT

A battery discharging apparatus is provided with a battery discharger and a control unit. The control unit is provided with a current sensor and a battery power capacity sensor. The control unit directs the discharger to recover battery capacity lost due to memory effect using a deep memory effect eliminating discharge.

3 Claims, 4 Drawing Sheets

BATTERY DISCHARGING APPARATUS

BACKGROUND OF THE INVENTION

This invention relates to a battery discharging apparatus, and in particular to an apparatus that recovers, by deep discharge, a battery's real power capacity which has been reduced due to the memory effect.

In general, the phenomenon called memory effect is well known. Memory effect, wherein battery voltage drops in two stages during deep discharge after a repetition of shallow charge-discharge cycles, occurs in rechargeable batteries such as nickel-cadmium or nickel-hydrogen batteries. Turning to FIG. 1, the dashed curve, A, represents the discharge characteristics of a battery with memory effect, while the solid curve, B, represents the discharge characteristics of a normal battery without memory effect. This FIGURE shows that as discharge progresses, voltage drops after a shorter service time for a battery with memory effect. Consequently, when a battery with memory effect is used in equipment that cuts off at a final voltage, the battery's real power capacity is reduced.

In this way, when memory effect occurs in a rechargeable battery used as a power source in various battery driven equipment, problems occur such as the working voltage of the rechargeable battery dropping below the operating voltage of the equipment, causing tile operating equipment to suddenly cease operation. On the other hand, battery driven equipment such as eight millimeter video cameras electrically disconnect the battery and cease camera operation when the battery voltage drops below tile camera's operating voltage. This is to avoid unpredictable equipment behavior caused by driving tile equipment at a reduced battery voltage.

Often the operating voltage For this type of equipment is set at a value that does not completely discharge the battery and leaves it with some residual power. Therefore, memory effect becomes particularly likely in these applications where the battery's charge discharge cycle is repeated.

Moderately deep discharge techniques have been developed to eliminate the memory effect (see for example, Japanese public disclosure 193516, 1987). The discharging apparatus described in this disclosure contains a discharging means to deeply discharge a rechargeable battery when its voltage drops below a set value. The discharging means utilizes either a timer to achieve deep discharge until a set time interval has passed or a battery voltage sensor to achieve deep discharge until a set voltage is reached.

The discharging apparatus described in this disclosure is characterized in that real battery power loss due to memory effect is recovered by deep battery discharge, or namely by memory effect eliminating discharge. Thus memory effect eliminating discharge is done to recover a battery's real power capacity when it has been reduced due to memory effect. For example, memory effect eliminating discharge would be accomplished when a battery's real power capacity dropped to 80% of its normal capacity. However, even deep discharge of a battery having no real power reduction due to memory effect produces no recovery of power capacity. Memory effect eliminating discharge of a battery with no memory effect not only wastefully consumes power, but also shortens the discharge cycle lifetime of the battery. Further, performing memory effect eliminating discharge every time battery voltage drops does not recover the battery's original real power capacity.

A discharging apparatus that automatically performs memory effect eliminating discharge whenever the battery voltage drops below a set value has the drawback that since memory effect eliminating discharge is accomplished every time the battery voltage drops, time is consumed deeply discharging the battery as well as recharging it from the deeply disharged state.

The present invention was developed to eliminate these drawbacks. It is thus a primary object of this invention to provide a battery discharging apparatus that can eliminate memory effect by discharging the battery at appropriate times.

SUMMARY OF THE INVENTION

The battery discharging apparatus of the present invention comprises a discharge means to discharge the battery and a control means to control the discharge. The control means comprises the following circuit.

The control means is provided with a current sensing means, to determine whether or not power is being delivered by the battery, and a battery power capacity sensing means to detect the battery's power level. When the current sensing means determines that power is not being delivered by the battery, and when tile battery power capacity sensing means detects that battery capacity has dropped below a prescribed level, the control means guides the discharge means to begin battery discharge. Thus, memory effect eliminating discharge is commenced by tile discharge means.

DETAILED DESCRIPTION OF THE INVENTION

The following describes preferred embodiments of the present invention based on illustrations.

Figure 1:
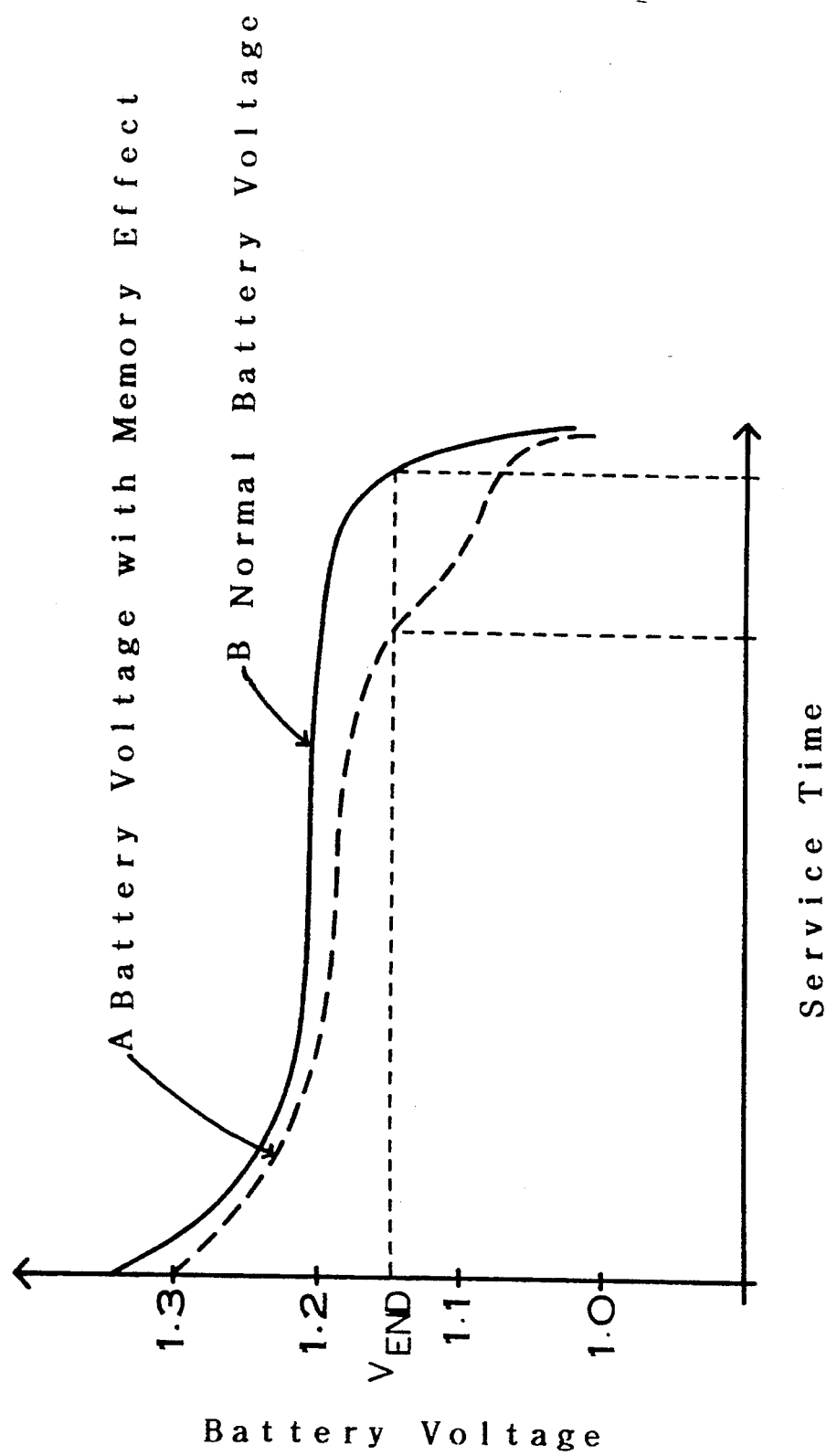
FIG. 1 is a graph showing battery voltage reduction due to memory effect.
Figure 2:
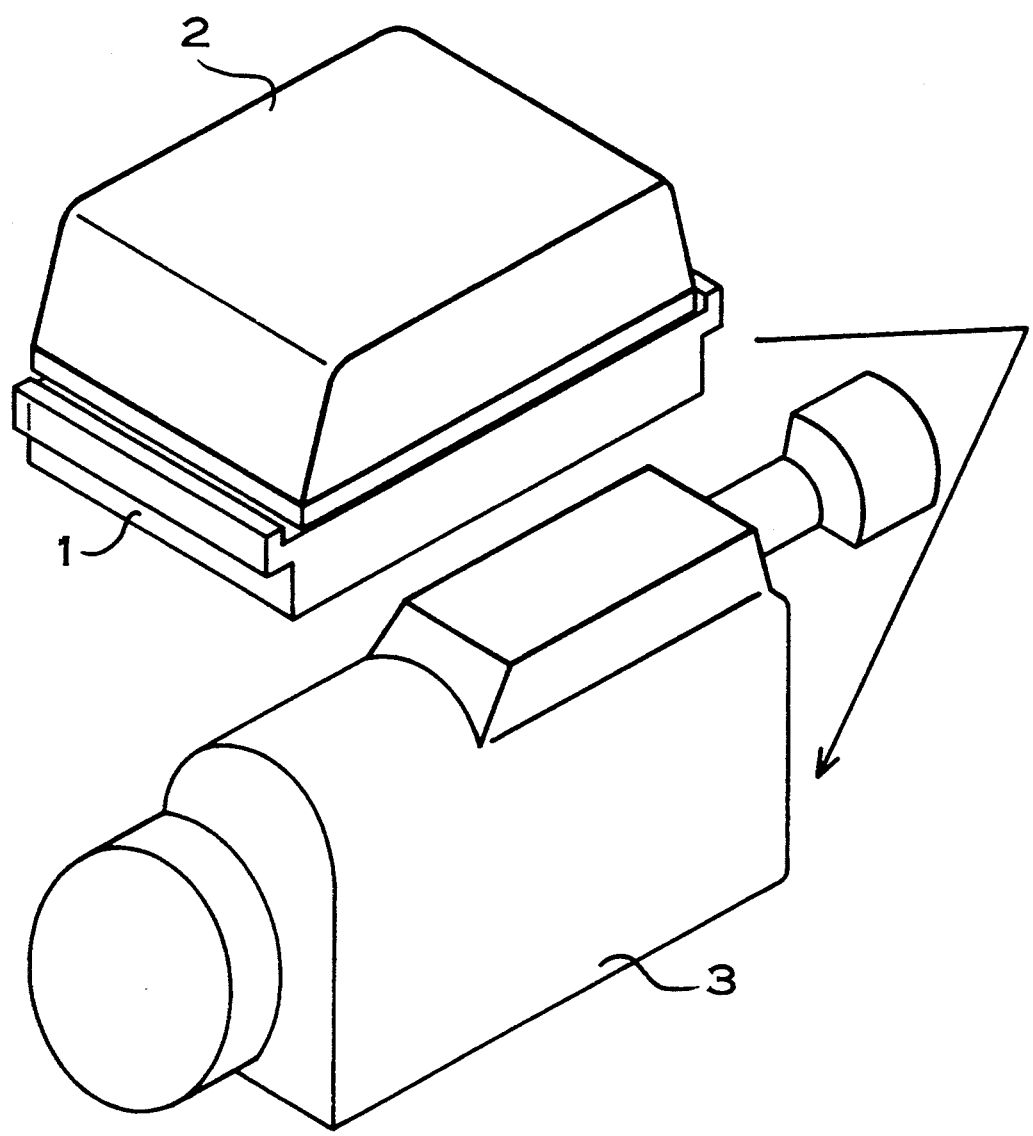
FIG. 2 is a perspective side view showing a battery pack, remaining power indicator adaptor, and eight millimeter video camera.

Part number 1 in FIG. 2 and is the remaining power indicator adaptor included in the battery discharging apparatus of this invention. This remaining power indicator adaptor 1 lies between the battery pack 2 and the eight millimeter video camera 3. Specifically, the adapter 1 is provided with mating surfaces to both the battery pack 2 and the video camera 3, and the battery pack 2 supplies power to the video camera 3 through the adapter 1. Further, as the driving power source, the battery pack's remaining power level is displayed by the adapter 1.

Figure 3:
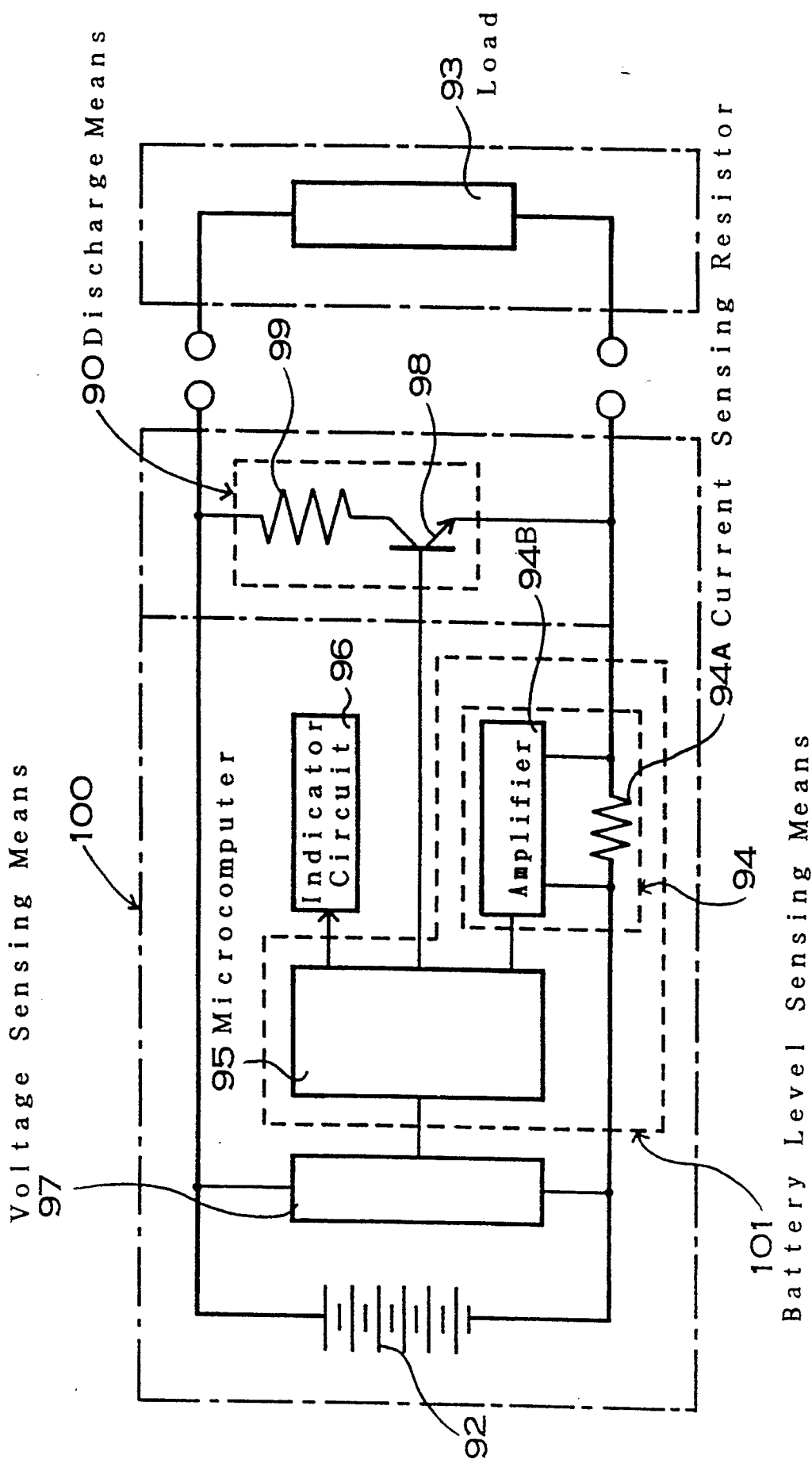
FIG. 3 is a block diagram of the a preferred embodiment of tile battery discharging apparatus circuit.

FIG. 3, is a block diagram of a discharging apparatus. The discharging apparatus of tills FIGURE is provided with a control means 100, a discharge means 90, and a indicator means 96. The control means 100 is provided with a voltage sensing means 97, a current sensing means 94, and a battery level sensing means 101.

The voltage sensing means 97 connects to both terminals of the battery cell array 92 to measure battery voltage. The current sensing means 94 connects in series with tile battery cell array 92 to determine whether or not power is flowing to or from the array. The current sensing means 94 is provided, for example, with a current sensing resistor 94A connected in series with the battery, and an amplifier 94B connected with both terminals of the current sensing resistor 94A to amplify its voltage. The current sensing resistor 94A produces a voltage in proportion to tile current of tile battery cell array 92. When power flows to tile load from the battery cell array 92 or charging current flows to tile battery cell array, the current sensing means 94 outputs a signal proportional to that current. The amplifier 94B is used to limit the size of the current sensing resistor 94A and reduce measurement loss.

The battery level sensing means 101 is provided with a microcomputer 95 to compute real battery power capacity from the output signal of the current sensing means 94. Signals from both tile current sensing means 94 and the voltage sensing means 97 are input to tile microcomputer 95. The microcomputer 95 contains an A/D converter (not illustrated) to convert the input analog signals to digital values.

The microcomputer 95 operates on input signals from both the current sensing means 94 and tile voltage sensing means 97 to compute real battery power capacity. The microcomputer 95 computes real battery power capacity until the battery voltage drops to tile final value $V_{END}$. Battery power capacity can be computed by integrating load current over time from a fully charged battery until voltage drops below the final value $V_{END}$. For example, tile final voltage $V_{END}$ is set to 1.16V per cell for NI-Cd batteries. However, the final voltage for power capacity computation $V_{END}$ is set equal to, or slightly higher than the powered equipment's cut-off voltage. For example, the powered equipment cut-off voltage is set from 1.14V to 1.15V. Voltage is set in this manner because battery power capacity is computed while the battery is discharging during use of the powered equipment. If the final voltage for power capacity computation $V_{END}$ were below the cut-off voltage of the powered equipment, discharge through the load would end before the power capacity computation was complete and capacity calculation would be impossible.

The discharge means 90 is connected in parallel with the battery cell array 92 and performs a deep discharge memory effect eliminating resistive discharge on a battery with reduced power capacity due to memory effect. The discharge means 90 is provided with a discharge resistor 99 and a series connected switching element 98. The switching element 98 is controlled by signals from the battery level sensing means 101. When the switching element 98 is turned on, memory effect eliminating resistive discharge is performed on the battery via the discharge resistor 99. When the switching element 98 is turned off, memory effect eliminating resistive discharge is stopped.

The indicator means 96 displays battery power capacity during normal use and indicates discharge during memory effect eliminating resistive discharge.

Figure 4:
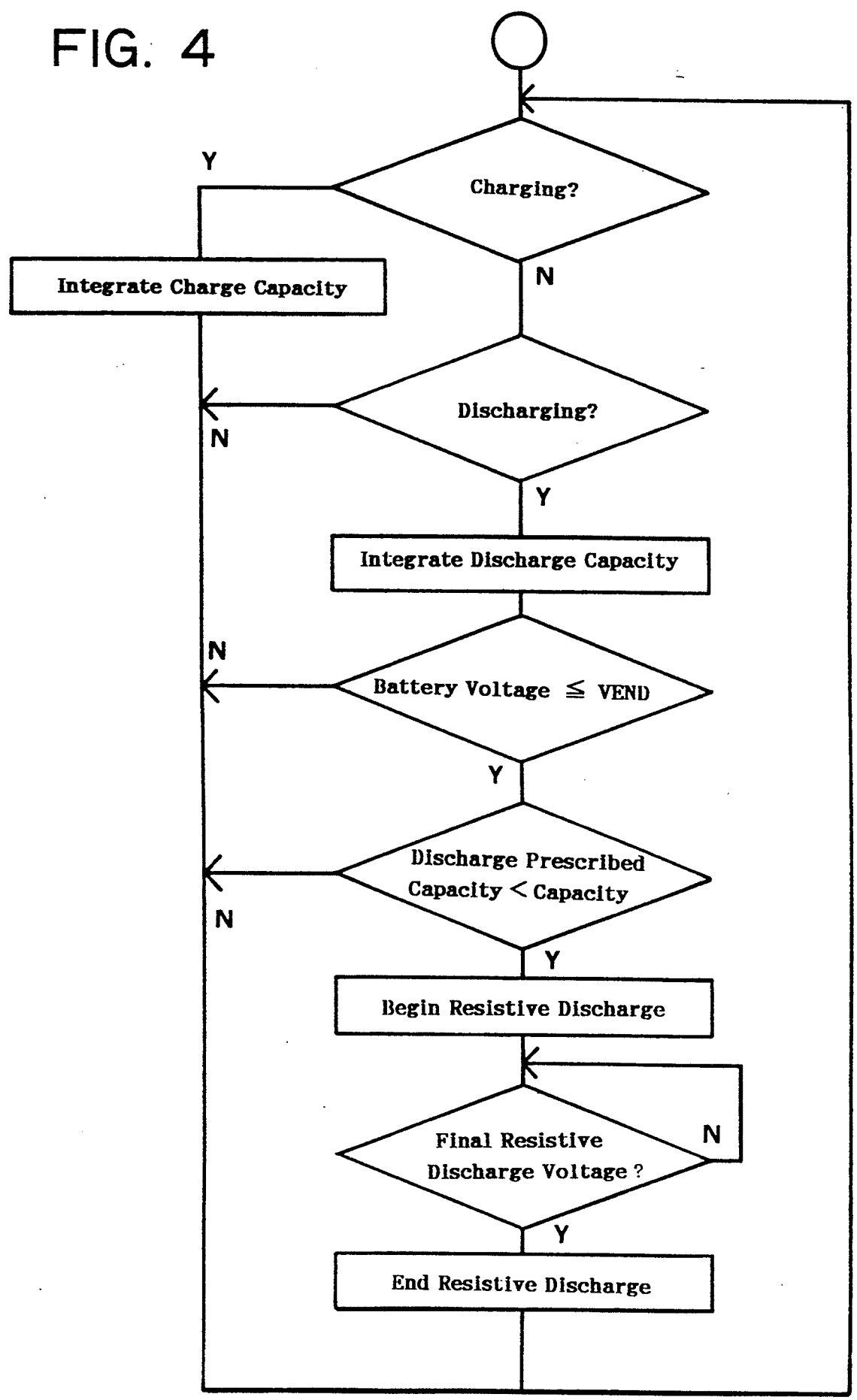
FIG. 4 is a flowchart showing the operation of the battery discharging apparatus of FIG. 3.

The discharging apparatus described above operates in the following manner depicted by the flowchart of FIG. 4.

(1) Decide whether or not the battery is being charged. When the battery pack is connected to a battery charger and is being charged, the current sensing means 94 measures charging current which is input to the to the microcomputer 95. The microcomputer 95 judges that tile battery cell array 92 is being charged and turns the switching element 98 of the discharge means 90 off. Therefore, when the battery cell array 92 is being charged, memory effect eliminating resistive discharge via the discharge means 90 does not take place. In addition, tile indicator means 96 does not indicate discharge.

(2) When the battery is not being charged, the microcomputer 95 determines If the battery is discharging. When the battery is connected to, and supplying current to the load, the current sensing means 94 measures load current and inputs this to the microcomputer 95. In this state, the switching element 98 of the discharge means 90 is turned off and memory effect eliminating resistive discharge is not performed.

(3) When the microcomputer 95 determines from the signal from the current sensing means 92 that the battery is discharging, the microcomputer 95 integrates the current sensing means 92 signal to compute power capacity. After the integration, the microcomputer 95 compares the signal from tile voltage sensing circuit with the final voltage $V_{END}$. If the battery voltage is greater than $V_{END}$, battery capacity is integrated while repeating the following loop.

integrate capacity→battery voltage<$V_{END}$? →charging? "discharging? →integrate capacity (4) When the battery vol take drops below the final value $V_{END}$, the microcomputer 95 compares the integrated battery capacity with tile prescribed battery capacity. The prescribed battery capacity is set ahead of time in microcomputer 95 memory. For example, the prescribed battery capacity is set in tile range 60% to 90%, and preferably in the range 70% to 85% of the battery's original specified capacity. When the battery capacity is smaller than tile prescribed value, the discharge means 90 begins battery discharge. While the discharge means 90 performs memory effect eliminating resistive discharge, the indicator means 96 indicates the discharge taking place.

The microcomputer 95 can also begin memory effect eliminating resistive discharge by computing power capacity from the remaining battery capacity. Remaining battery power can be computed by subtracting discharged capacity from the battery's original specified capacity. Specifically, remaining battery power can be computed by subtracting the power capacity discharged until tile final voltage $V_{END}$ is reached from the battery's original specified capacity. When the remaining battery power becomes less than the prescribed capacity in microcomputer 95 memory, or similarly the discharged capacity becomes greater than a prescribed value, the microcomputer begins memory effect eliminating resistive discharge.

(5) The microcomputer 95 determines the battery voltage from the voltage sensing circuit signal and judges whether the battery voltage has reached the Final discharge voltage or not. The battery is discharged until the battery voltage reaches the final discharge voltage. This discharge is a deep memory effect eliminating resistive discharge. The final discharge voltage is a voltage that discharges the battery deeply, for example, the final discharge voltage is set to IV per cell for N1-Cd batteries.

Operations (1) through (5) are repeated and the battery is discharged when its power capacity decreases due to memory effect. Moreover, memory effect eliminating resistive discharge is performed after checking that the battery is neither charging nor discharging. Since the operations (1) through (5) are repeated in a loop, memory effect eliminating resistive discharge is stopped if battery charging begins, or if the battery discharges through equipment lead.

The discharging apparatus shown in FIG. 3 is contained within tile battery pack. It is also possible to include the discharging apparatus in tile electronic equipment or in the battery charger. The battery discharging apparatus shown in FIG. 3 measures the battery s power capacity and performs memory effect eliminating resistive discharge when the power capacity decays below a fixed power capacity.

Memory effect eliminating resistive discharge serves to recover a battery's power capacity reduced due to memory effect. No power capacity recovery can take place for a battery with no power capacity reduction. Memory effect eliminating resistive discharge is begun by hand operation, when battery voltage drops below a fixed value, or when a discharged battery is not used for a set time interval. The discharging apparatus does not always deeply discharge a battery with power capacity reduced due to memory effect. On the other hand, deep discharge of a battery with no power capacity reduction consumes time during discharge as well as during recharge, and this reduces the battery's charge-discharge cycle lifetime.

The discharging apparatus shown in FIG. 3 has the feature that since memory effect eliminating resistive discharge is performed on the battery when its power capacity is reduced due to memory effect, there is no wasted discharging and recharging, and the battery is deeply discharged under ideal conditions. Furthermore, since power flow to or from the battery is sensed, memory effect eliminating resistive discharge is not started when the battery is being used. Therefore, a Feature of this apparatus and memory effect eliminating resistive discharge is that when the battery is again charged, it can attain its full power capacity, and stable activation of tile load can be guaranteed.

We claim:

1. A battery discharging apparatus comprising:
    (a) a discharge means for discharging tile battery,
    (b) a control means for controlling tile discharge means, and said control means provided with
        (1) a current sensing means to determine whether or not power is flowing to or from tile battery, and
        (2) a battery power capacity sensing means to determine battery capacity,
wherein tile control means controls the discharge means to begin battery discharge when said current sensing means determines that power is not flowing to or from the battery, and further, said battery power capacity sensing means determines that battery capacity is below a prescribed value.

2. A battery discharging apparatus as recited in claim 1 wherein tile discharge means comprises a discharge resistor and a switching element.

3. A battery discharging apparatus as recited in claim 1 wherein the control means contains a microcomputer.

* * * * *